United States Patent
Shigeta

(10) Patent No.: US 6,667,974 B1
(45) Date of Patent: Dec. 23, 2003

(54) PACKET REPEATER MACHINE AND PACKET RELAY METHOD

(75) Inventor: Yoshiaki Shigeta, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 0 days.

(21) Appl. No.: 09/501,143

(22) Filed: Feb. 9, 2000

(30) Foreign Application Priority Data

May 26, 1999 (JP) ............................................. 11-147138

(51) Int. Cl.[7] .......................... H04L 12/28; H04L 12/54
(52) U.S. Cl. ........................ 370/389; 370/428; 370/501
(58) Field of Search ................................. 370/428, 429, 370/465, 466, 471, 389, 392, 501, 401

(56) References Cited

U.S. PATENT DOCUMENTS 5,793,763 A  * 8/1998 Mayes et al. ................. 370/389
6,421,732 B1 * 7/2002 Alkhatib et al. ............. 709/245
6,480,468 B1 * 11/2002 Kishigami et al. ........ 370/230.1
6,501,767 B1 * 12/2002 Inoue et al. ................. 370/465

* cited by examiner

Primary Examiner—Wellington Chin
Assistant Examiner—Chirag Shah
(74) Attorney, Agent, or Firm—VENABLE; James R. Burdett

(57) ABSTRACT

The packet repeater machine in accordance with the present invention comprises a forward table, a forward destination registration part and a header conversion part. The forward table stores the relationship between the forward origination address and the forward destination address. The forward destination registration part registers the forward origination address and the forward destination address to the forward information storage means based on the input information from outside. The header conversion part compares a destination address, which is stored in a packet to be transmitted from a first network to a second network, and the forward origination address registered in the forward information storage means, and, if these addresses match, convert the destination address to the forward destination address. The packet repeater machine of the present invention executes processing for switching addresses as a part of packet relay processing. Therefore processing for forwarding a data packet, which is addressed to a standby system server machine, to an active system server machine, can be easily executed.

18 Claims, 16 Drawing Sheets

| Forward Origination Address | Forward Destination Address |
|---|---|
| L (a) | L (c) |
| L (d) | L (e) |
| L (b) | L (c) |

| Local Address | Global Address |
|---|---|
| L (a) | G (a) |
| L (b) | G (b) |
| L (c) | G (c) |

FIG. 14

| Forward Origination Local Address | Forward Origination Global Address | Forward Destination Local Address |
|---|---|---|
| L (a) | G (a) | L (c) |
| L (b) | G (b) | L (c) |

FIG. 18A

| Forward Origination Address | Forward Destination Address | |
|---|---|---|
| L (b) | L (a) | ~E1 |
| L (c) | L (a) | ~E2 |

FIG. 18B

| Forward Origination Address | Forward Destination Address | |
|---|---|---|
| L (a) | L (b) | ~E3 |
| L (c) | L (b) | ~E2 |

FIG. 18C

| Forward Origination Address | Forward Destination Address | |
|---|---|---|
| L (a) | L (b) | ~E3 |
| L (c) | L (a) | ~E2 |

PACKET REPEATER MACHINE AND PACKET RELAY METHOD

BACKGROUND OF THE INVENTION

1. Field of the Invention

The present invention relates to a packet repeater machine and packet relay method for inter-connecting networks. The present invention is applied, for example, to a gateway machine for relaying a local network and global network.

2. Description of Related Art

A technology to construct a global communication network by connecting such a local network as a corporate LAN (Local Area Network) to such a global network as the Internet has been known.

In a global network, a global network address to uniquely identify a local machine in the world, that is, a global address, is assigned to an individual local machine. A known global address is, for example, the IP (Internet Protocol) address. Local machines include a server machine. So by using the global address, a server machine in a local network can be uniquely identified. In a global network, a communication destination is specified by the global address for transmitting/receiving data packets.

In a local network, on the other hand, an address unique to the local network, that is, a local address, may be used. The local address is used to identify a terminal or a server machine within the local network. A known local address standard is, for example, the one specified in RFC 1597 for TCP/IP (Transmission Control Protocol/Internet Protocol). In this standard, only a special address in a range called the "private address space" is used. A local address cannot be used in a global network. Therefore, a machine directly connected to a global network or a machine connected to another local network cannot identify a machine in the local network by the local address.

When a machine outside a local network communicates with a machine in the local network, relay processing involving the conversion of addresses is executed. This relay processing is executed, for example, by a gateway machine.

A gateway machine has the function to execute mutual conversion between a global address and a local address. This function is called NAT (Network Address Translation), and was standardized by RFC 1631 for TCP/IP. By using the NAT function, communication between a machine outside a local network and a machine inside the local network becomes possible.

When a local network is connected to a global network, a server machine in the local network becomes to be randomly accessed by an unspecified number of general public users worldwide, anytime, day or night. Therefore, it is desirable for the server machine to accept access all the time non-stop. For a server machine to function as a Web server or FTP (File Transfer Protocol) server, in particular, accepting real-time random access is required.

To meet such a requirement, a plurality of server machines having the same function may be installed in one local network. In this case, access from the global network can always be accepted since one of the server machines can be run, even while a server machine is shutdown for maintenance, inspection, updating or changing service content, or for upgrading to a higher function machine. Generally a machine which is operating is called an "active system server machine", and a machine which is not operating is called a "standby system server machine". When an active system server machine stops operation and becomes a standby system server machine for maintenance, inspection or other reason, a standby system server machine begins operation and becomes an active system server machine. This operation is referred to as "switching of systems".

To execute switching of systems, the active system server machine receives the data packets sent to the standby server machine. Conventionally, data packets addressed to the standby system server machine have been received by the active system server machine by rewriting the registration content of the DNS (Domain Name System) server each time a switching of systems is executed. The DNS server is a name server to convert the host name of a machine to be accessed to such a network address as the IP address. Details on DNS are specified in RFC 1034 for the TCP/IP standard. By rewriting the network address of a server machine, which will be switched to a standby system, to the network address of a server machine, which will be switched to an active system, data packets are always received by the server machine running at that time, that is, by the active system server machine. Therefore another machine which accesses the server machine via a global network does not have to recognize the switching of systems.

However, the method of rewriting the network address of the DNS server can be used when the server machine to be accessed is specified by the host name, but cannot be used when the server machine to be accessed is specified by the network address from the beginning. The host name is used more frequently than the network address as the server specification method in WWW (World Wide Web) browsers since the method of using the host name is more user friendly and is ergonomically better. This is because a character string, which is easy to remember, can be used for the host name, while a network address is expressed with a numeric string, which has no meaning. However, a method of using the network address is also used as the server specification method in WWW browsers. Therefore it is desirable for the active system server machine to receive the data packets sent to the network address of the standby system server machine.

Also, the method of rewriting the network address of the DNS server cannot be used for a local network which does not have a DNS server. For example, in the case of a small scale LAN limited to a small number of information processing units, such as SOHOMO (Small Office Home Office Mobile Office), a DNS server is often not installed in the network. Generally, a small LAN uses a DNS server outside the network when a DNS server is necessary, so as to decrease the cost required for installation and operation of the server. A DNS server outside the network can be accessed by, for example, joining the DNS server access service of the ISP (Internet Service Provider). In the case of a local network, where a DNS server is not installed or a local network which uses a DNS server outside the network, a method of rewriting the network address of a DNS server cannot be used.

SUMMARY OF THE INVENTION

It is an object of the present invention to provide a technology which can switch the address of a machine, even when the machine is specified by a network address, and can switch the address of a machine without using a DNS server.

A packet repeater machine in accordance with the present invention comprises: forward information storage means for storing the relationship between a forward origination address and a forward destination address; forward registration means for registering the forward origination address and the forward destination address to the forward information storage means based on input information from the outside; and header conversion means for converting a destination address to the forward destination address when the destination address, which is stored in a packet to be transmitted from a first network to a second network, matches the forward origination address registered in the forward information storage means.

By rewriting the destination address with the forward destination address using the packet repeater machine, an address can be converted using a simple configuration.

A packet relay method in accordance with the present invention comprises steps of: registering the forward origination address and the forward destination address in the forward information storage means based on input information from outside; and executing header conversion processing for converting a destination address to the forward destination address when the destination address, which is stored in a packet to be transmitted from the first network to the second network, matches with the forward origination address registered in the forward information storage means.

By executing processing, rewriting the destination address with the forward destination address as a part of packet relay processing, an address can easily be converted.

BRIEF DESCRIPTION OF THE DRAWINGS

Other objects and advantages of the present invention will now be described with reference to the accompanying drawings.

FIG. 14 is a conceptual diagram depicting a structure of a recovery table in accordance with the fifth embodiment;

FIG. 18A, FIG. 18B and FIG. 18C are conceptual diagrams depicting a structure of a forward table in accordance with the sixth embodiment.

DESCRIPTION OF THE PREFERRED EMBODIMENTS

Figure 1:
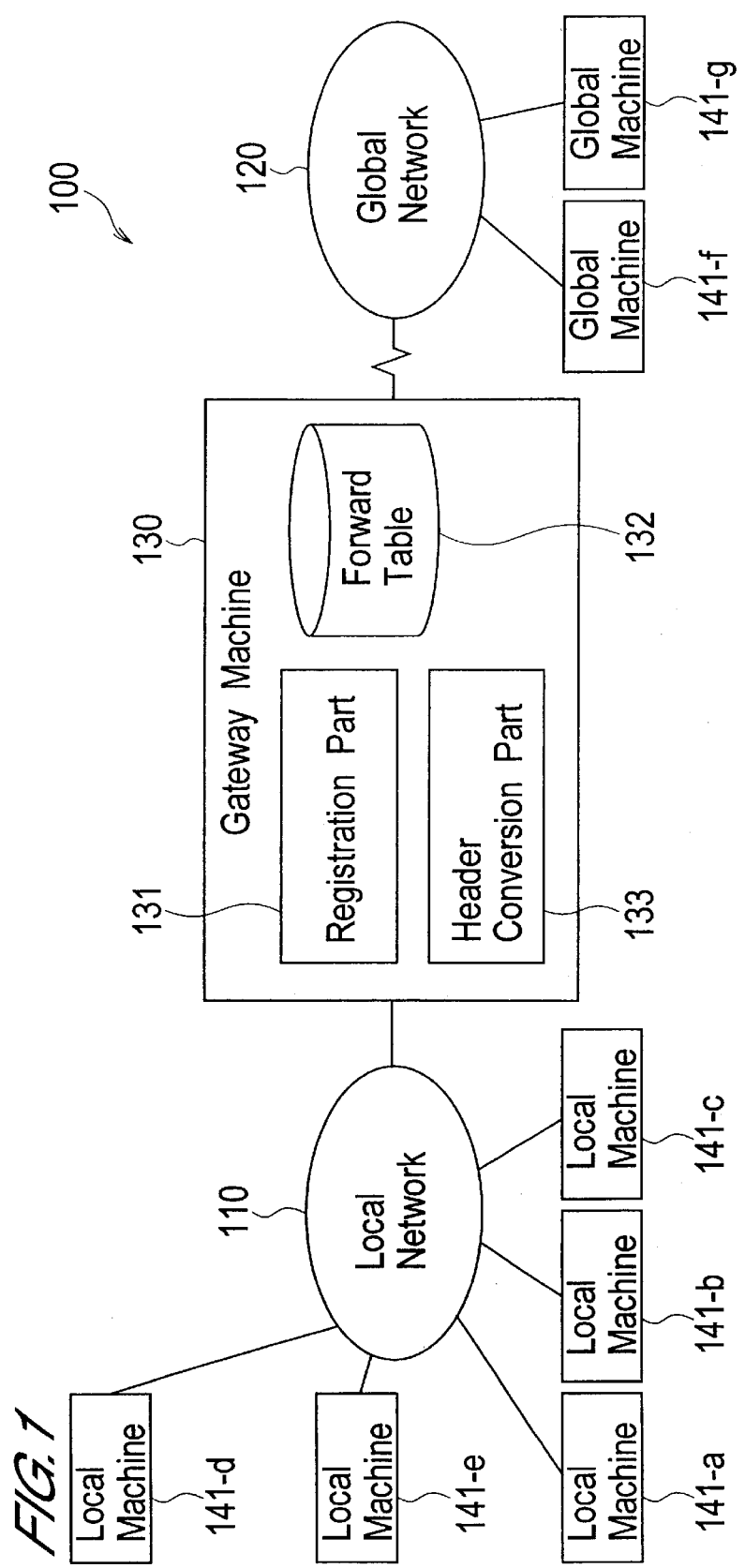
FIG. 1 is a conceptual diagram depicting an overall structure of a communication network in accordance with the first embodiment.

Embodiments of the present invention will now be described with reference to the accompanying drawings. In the drawings, the size, shape and layout relationship of each composing element are roughly shown merely to help understand the present invention, and numerical values used in the description below are merely examples.

The packet repeater machine and packet relay method of the present invention will be described using the case of applying the present invention to a gateway machine as an example.

First Embodiment

FIG. 1 is a conceptual drawing depicting a general structure of a communication network in accordance with the present embodiment.

As FIG. 1 shows, in this communication network 100, a local network 110 and a global network 120 are connected via a gateway machine 130.

For the local network 110, a normal LAN can be used, or a small scale LAN, such as SOHOMO, can be used. A client server system, peer-to-peer system or other systems can be used for the system format of the local network 110. This embodiment will be described using the case when a peer-to-peer system is used.

For each information processing unit, that is, a local machine, of the LAN where a peer-to-peer system is used, the very same hardware equipment can be used. For the local machine, a personal computer, for example, can be used. When a personal computer is used as the local machine, software-based server functions are mounted in the personal computer to be used as the server machine, and software-based client functions are mounted in a personal computer to be used as the client machine. In FIG. 1, only local machines 141-a, 141-b, 141-c, 141-d and 141-e are shown as servers, and the local machine as the client is omitted to be shown.

The local machines 141-a, 141-b and 141-c are FTP servers. FTP is a file transfer protocol which is used as the standard in TCP/IP networks. In the local machines 141-a–141-c, a file with the same content is stored. Installing a plurality of FTP servers to transfer files with the same content is effective in handling the increase in loads when access is concentrated to an FTP server. In the initial state, the local machines 141-a and 141-b are the active system server machines, and the local machine 141-c is the standby system server machine. The local machine of the standby system is set so as not to operate as a server. In order not to operate the local machine as a server, a method of setting to client mode, a method of setting to server mode and turning that function off, or another method is used. As an identifier, the local address L(a) is assigned to the local machine 141-*a*, the local address L(b) is assigned to the local machine 141-*b* and the local address L(c) is assigned to the local machine 141-*c*.

The local machines 141-*d* and 141-*e* are mail servers. In the initial status, the local machine 141-*d* is the mail server of the active system, and the local machine 141-*e* is the mail server of the standby system. As an identifier, the local address L(d) is assigned to the local machine 141-*d*, and the local address L(e) is assigned to the local machine 141-*e*.

As a global network 120, the Internet, for example, is used. To the global network 120, many information processing units, that is, global machines are connected. In FIG. 1, only two global machines 141-*f* and 141-*g* are shown. The global address of the global machine 141-*f* is G(f) and the global address of the global machine 141-*g* is G(g). For the global machine, the same equipment as the local machine, hardware and software, can be used.

The gateway machine 130 is a machine to relay the local network 110 and the global network 120. Therefore the gateway machine 130 has an interface with the local network 110 and an interface with the global network 120.

Since access from the global machines 141-*f* and 141-*g* to the local machines 141-*a*–141-*e* must always be executed via the gateway machine 130, the gateway machine 130 is indispensable for a communication network where the local network 110 and the global network 120 are connected. As FIG. 1 shows, the gateway machine 130 logically exists outside the local network 110, but physically or geographically the gateway machine 130 exists in the local network 110. Generally, the gateway machine 130 is managed and operated by an administrator of the local network 110.

For the gateway machine 130, a personal computer which includes a DSP (Digital Signal Processor) card, for example, can be used. The functions of the gateway machine 130 are normally implemented by software. This means that one personal computer can function as the server machine and a gateway machine. For this embodiment, the case when the server machine and the gateway machine are separate units will be explained to simplify explanation.

In the gateway machine 130, a packet forward destination registration part 131, a forward table 132 and a header conversion part 133 are created. In the following description, "forward" means to make a data packet sent to one of the local machines to received into another local machine, by rewriting the destination local address of the data packet. The "forward origination" is a local machine corresponding to the destination address before rewriting. "Forward destination" is a local machine corresponding to the destination address after rewriting.

The registration part 131 rewrites the forward table 132 when the active system/standby system of the local machines 141*a*–141-*e* is switched.

Figures 2, 3:
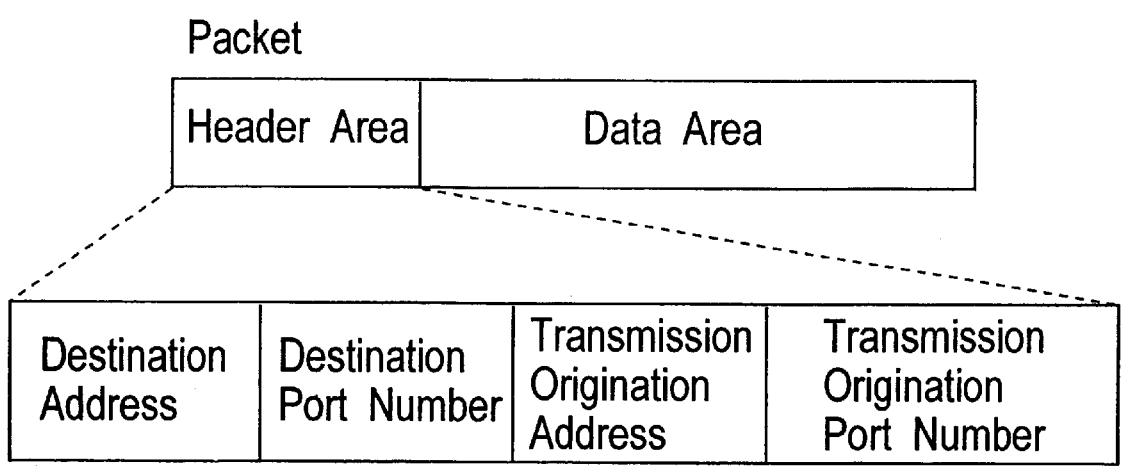
FIG. 2 is a conceptual diagram depicting a structure of a forward table in accordance with the first embodiment.
FIG. 3 is a conceptual diagram depicting a structure of a data packet.

The forward table 132 is a table indicating the relationship between the forward origination address and the forward destination address. In the column of the forward origination address, an address of the standby system server machine is written. In the column of the forward destination address, the address of an active system server machine is written. FIG. 2 is a conceptual drawing depicting a structure of the table 132. In the example shown in FIG. 2, three pairs of a forward origination address and a forward destination address have been entered.

The conversion part 133 converts the destination address in a data packet using the table 132. FIG. 3 is a conceptual diagram depicting a structure of the data packet. As FIG. 3 shows, the data packet has a header area and a data area. In the header area, a destination address, destination port number, transmission origination address and transmission origination port number are stored. When the destination address in the header area matches one of the forward origination addresses in the table 132, the conversion part 133 rewrites the destination address to the forward destination address corresponding to the forward origination address.

Now detailed operation of the gateway machine 130 in accordance with the present embodiment will be described.

As mentioned above, the gateway machine 130 executes processing for registering the forward destination of the packet, and processing for converting the header information of the packet. Forward destination registration processing is processing for changing, adding or deleting the entry of the table 132, and is executed by the registration part 131. The header information conversion processing is processing for converting the destination address of the data packet using an entry of the table 132, and is executed by the conversion part 133.

Figure 4:
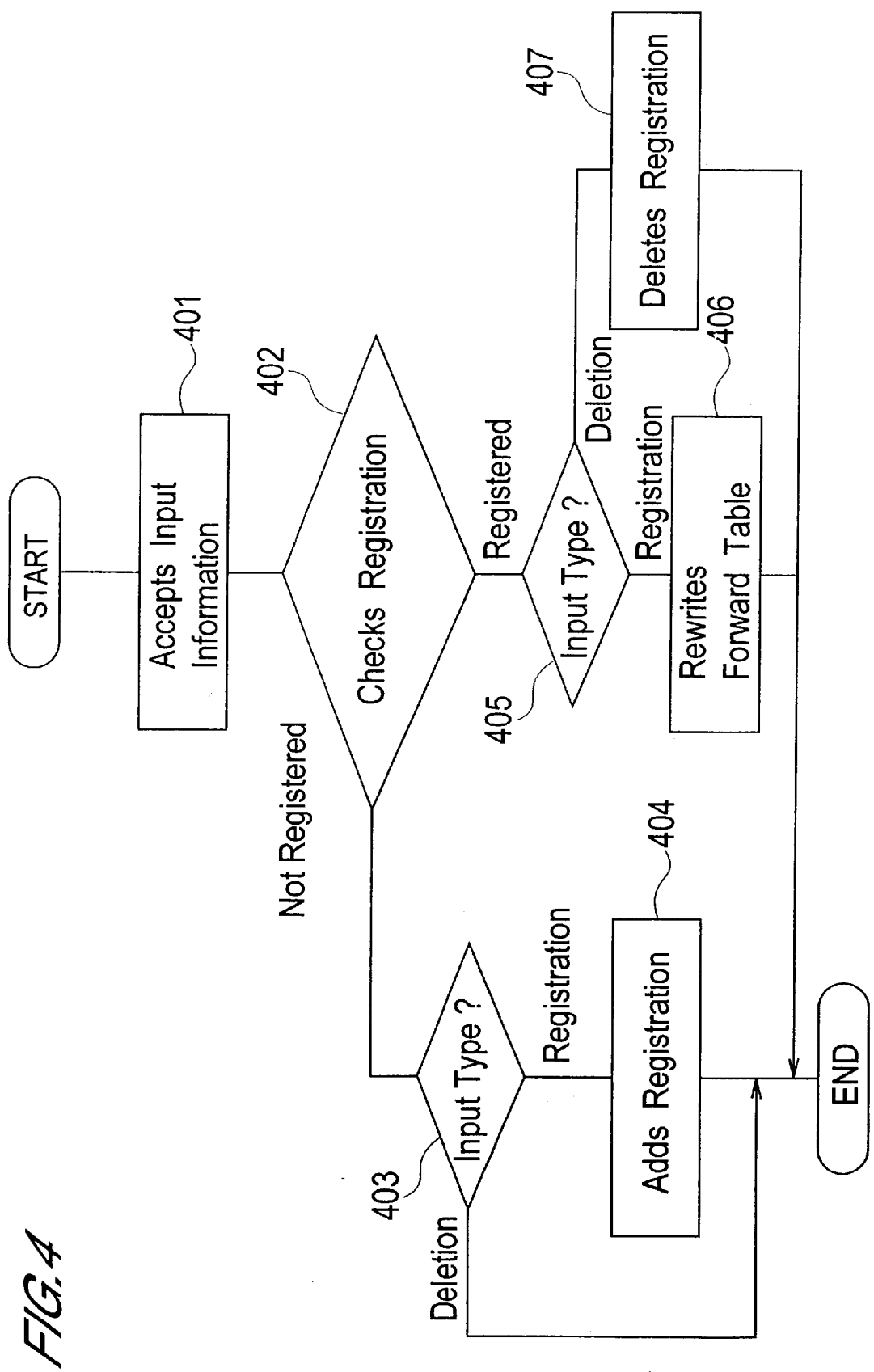
FIG. 4 is a general flow chart depicting forward destination registration processing in accordance with the first embodiment.

FIG. 4 is a general flow chart depicting the forward destination registration processing.

Figure 5:
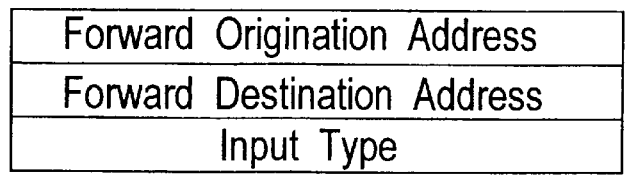
FIG. 5 is a conceptual diagram depicting a data configuration of input information in accordance with the present invention.

In Step 401, the registration part 131 accepts input information from outside the gateway machine 130. The input information is sent from one of the local machines to the gateway machine 130. In addition, the registration information may be transmitted from the global machine to the gateway machine 130 if necessary. FIG. 5 is a conceptual diagram depicting a data configuration of the input information. As FIG. 5 shows, the input information includes a forward origination address, forward destination address and an input type. The input type is a data to indicate the distinction between the forward registration and the deletion of registration.

Then in Step 402, the registration part 131 checks whether the forward origination address stored in the input information has been registered as the forward origination address in the table 132.

If it is judged that the forward origination address stored in the input information has not been registered as the forward origination address in the table 132 in Step 402, then the registration part 131 checks the input type stored in the input information in the Step 403. And if this input type is a deletion of registration, then the registration part 131 adds a new entry in the table 132 in the Step 404. For the forward origination address and the forward destination address of an entry to be added, a forward origination address and forward destination address read from the input information are used. If it is judged that the input type is a deletion of the registration in the Step 403, on the other hand, the registration part 131 ends the forward destination registration processing without executing any processing.

If it is judged that this forward origination address has already been registered in the Step 402, then the registration part 131 checks the input type stored in the input information in the Step 405. If this input type is a forward registration, then the registration part 131 rewrites the table 132 in the Step 406. In the rewriting process in the Step 406, the forward destination address corresponding to this forward origination address is rewritten to the forward destination address stored in the input information. If it is judged that the input type is a deletion of the registration in the Step 405, on the other hand, the registration part 131 deletes the entry related to this forward origination address in the table 132 in the Step 407.

A concrete example of forward destination registration processing when operation of the FTP server machine 141-*a* is stopped and the local machine 141-*c* is operated as an alternative machine will be explained next.

In this example, a state where the server machines 141-*a* and 141-*b* are the active system and the server machine 141-*c* is the standby system shifts to a state where the machines 141-*b* and 141-*c* are the active system and the machine 141-*a* is the standby system. This means that in the input information, the local address L(a) of the machine 141-*a* is stored as the forward origination address, the local address L(c) of the machine 141-*c* is stored as the forward destination address, and the "forward registration" is stored as the input type.

This input information is sent from the machine 141-*a* or 141-*c* to the gateway machine 130. The registration part 131 accepts this input data in the step 401, and judges that L(a) has not been registered as a forward origination address in the Step 402. Then the registration part 131 judges that the input type is a "forward registration" in the Step 406, and executes a new entry to the table 132 in the Step 407 and ends registration processing.

Figure 6:
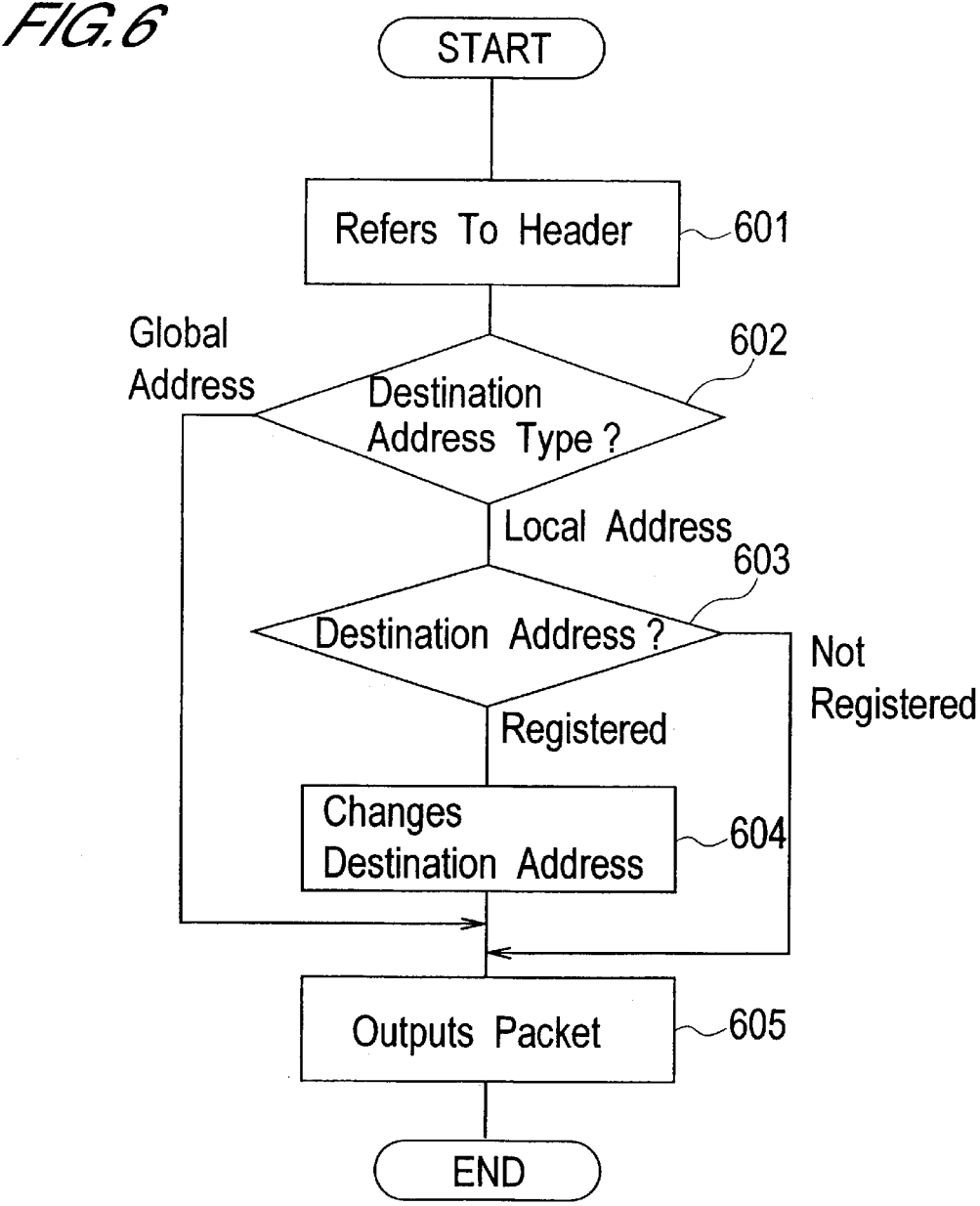
FIG. 6 is a general flow chart depicting header information conversion processing in accordance with the first embodiment.

FIG. 6 is a general flow chart depicting the header information c conversion processing.

The conversion part 133 receives a data packet from outside the gateway machine 130. The data packet is received by the gateway machine 130 via the local network 110 or the global network 120.

When the data packet is received, the conversion part 133 reads the destination address from the header area of the data packet in the Step 601. Then the conversion part 133 checks whether the read destination address is a local address or global address in the Step 602. If the read destination address is a global address, the conversion part 133 outputs this data packet to the global network 120 in the Step 605, and ends the header information conversion processing.

If the read destination address is a local address in the Step 602, then the conversion part 133 searches this destination address from the forward origination a addresses in the table 132. If the destination address has not been registered, then the conversion part 133 outputs this data packet to the local network 110 in the Step 605, and ends the header information conversion processing.

If the destination address has been registered in the Step 603, then the conversion part 133 reads the forward destination address corresponding to this destination address from the table 132. Then the conversion part 133 rewrites the read forward destination address on the header area of the data packet as a destination address in the Step 604.

Then the conversion part 133 outputs the data packet to the local network 110, and ends the header information conversion processing.

A concrete example of the header information conversion processing when operation of the FTP server machines 141-*a* and 141-*b* is stopped for maintenance and inspection and the local machine 141-*c* is operated as an alternative machine will be explained next. In this example, the content of the entry in the table 132 is the state shown in FIG. 2.

At first, a data packet where L(a) or L(b) is stored as a destination address is transmitted from one of the local machines or the global machine, and is received by the gateway machine 130.

As mentioned above, the conversion part 133 reads the destination address in the Step 601, and checks the type of the destination address in the Step 602. In this case, the destination address is a local address L(a) or L(b), so the conversion part 133 searches the forward table in the Step 603. In this search, L(c) is read as the forward destination address corresponding to L(a) or L(b). Then the conversion part 133 rewrites the destination address to L(c) in the Step 604, and outputs the data packet in the Step 605.

In this way, the data packet where the header information is converted is received by the server machine 141-*c*. In other words, the data packets where L(a) or L(b) is stored as a destination address are all forwarded to the server machine 141-*c*.

When all the data packets addressed to the server machine 141-*a* and 141-*b* are forwarded to the server machine 141-*c*, the loads distributed to two server machines 141-*a* and 141-*b* concentrate to one server machine 141-*c*. An example of avoiding the concentration of loads is where the server machine 141-*a* is switched to a standby system and the server machine 141-*c* to an active system first, and when maintenance and inspection for the machine 141-*a* ends, the server machine 141-*b* is switched to a standby system and the machine 141-*a* to an active system, then maintenance and inspection of the machine 141-*b* is executed.

As explained above, according to the present embodiment, the destination address to forward the data packet can be rewritten by the gateway machine 130. This means that in this embodiment, data can be forwarded without using the DNS server. Therefore a data packet can be forwarded even on a local network that does not have a DNS server, or on a local network where an external DNS server is used. Since a gateway machine is always installed on a local network to be connected to a global network, this embodiment can be applied to all the local networks.

In addition, since a DNS server is not used, a data packet can be forwarded regardless whether the host name is used or a network address is used as the local address. Therefore this embodiment can also be applied to a network where Internet telephone and such a server machine for CHAT are used.

The packet forward destination registration processing of this embodiment, where processing content is simple, can easily be executed. In addition, this registration processing is executed only when setting or canceling a forward function, which is infrequent, therefore the effect on the processing speed of the gateway machine is minimal.

The header conversion processing of this embodiment is a processing equivalent to the packet relaying of the network layer, which a gateway machine normally executes. Therefore adding the header conversion processing function of this embodiment to a conventional gateway machine is easy.

Since packet relaying in the network layer is the main purpose of the gateway machine, packet relaying can generally be executed at high-speed. Therefore even if the packet forward destination registration processing function and the header conversion processing function of the present embodiment are added to a conventional gateway machine, the operation load is small. The band used for connection with the global network is much smaller than the band used on the local network, which makes it clear that adding functions of the present embodiment causes no operation delays of the gateway machine. Generally the band used on a local network is 10–1000 Mbps, while the band allocated to the connection with the global network is 1.5 Mbps or less.

Second Embodiment

The general configuration of the gateway machine in accordance with this embodiment is the same as that of the first embodiment (see FIG. 1). In the second embodiment, however, the function of the header conversion part 133 is different from that of the gateway machine of the first embodiment.

The header conversion part 133 of this embodiment has the same header function as the first embodiment. In addition, the conversion part 133 of this embodiment has a function to convert the header of a data packet, which is sent from the local machine to the global machine, using the table 132. In the following description, this function is referred to as the "reverse header conversion function".

As FIG. 3 shows, the transmission origination address is stored in the header area of the data packet. Therefore in the case of the first embodiment, the global machine can recognize the execution of a forward by checking the transmission origination address of the data packet received from a local machine. In other words, when the forward is executed by the gateway machine of the first embodiment, the global machine can recognize the execution of a forward by comparing the destination address of the data packet sent to the local machine and the transmission origination address of the data packet received as a reply to this data packet. However a global machine knowing of the execution of a forward may cause security problems. In the case of the gateway machine of the present embodiment, the conversion part 133 has a function to rewrite the transmission origination address, so that the global machine cannot recognize the execution of a forward.

Figure 7:
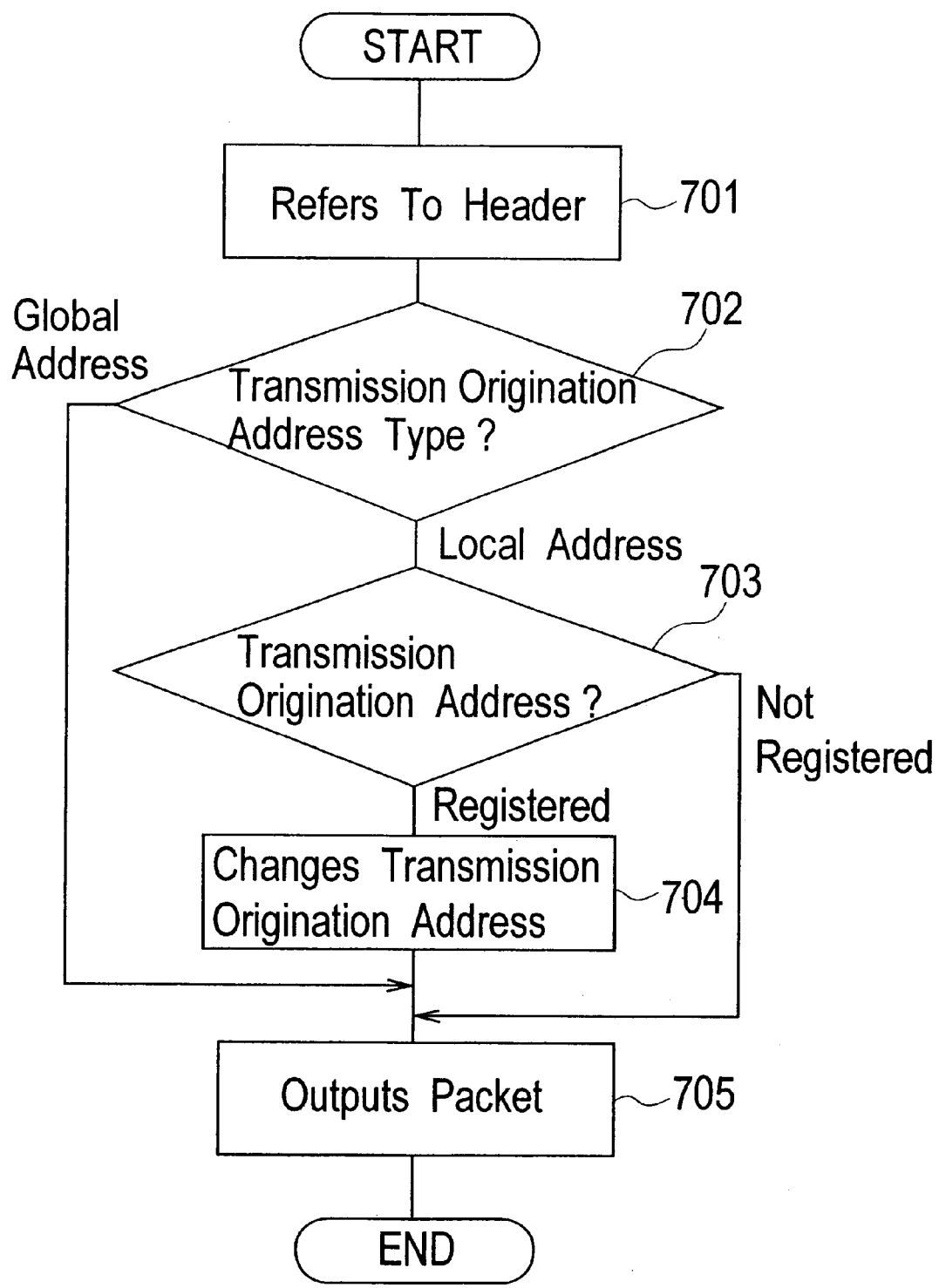
FIG. 7 is a general flow chart depicting reverse header information conversion processing in accordance with the second embodiment.

FIG. 7 is a general flow chart depicting the reverse header conversion processing.

The conversion part 133 receives a data packet from one of the local machines 141-a–141-e.

When a data packet is received, the conversion part 133 reads the transmission origination address from the header area of the data packet in the Step 701. Then the conversion part 133 checks whether the read transmission origination address is a local address or a global address in the Step 702. If the read transmission origination address is a global address, the conversion part 133 outputs this data packet to the local network 110 in the Step 705, and ends the reverse header conversion processing.

If the read transmission origination address is a local address in the Step 702, the conversion part 133 searches this transmission origination address from the forward destination addresses of the table 132 in the Step 703. If the transmission origination address has not been registered, the conversion part 133 outputs this data packet to the global network 120 in the Step 705, and ends the reverse header conversion processing.

If the transmission origination address has been registered in the Step 703, the conversion part 133 reads the forward origination address corresponding to this transmission origination address from the table 132. Then the conversion part 133 rewrites the header area of the data packet with the read forward origination address as the transmission origination address in Step 704.

Then the conversion part 133 outputs the data packet after rewriting to the global network 120 in the Step 705, and ends the reverse header conversion processing.

Descriptions on the packet forward destination registration processing and the header conversion processing, which are the same as those of the first embodiment, are omitted.

The gateway machine in accordance with the present embodiment has the same advantages as the gateway machine in accordance with the first embodiment, and also has an advantage of improving security by the reverse header conversion function.

Third Embodiment

This embodiment is an example when the present invention is applied to a gateway machine of a local network which uses a private address space.

Figure 8:
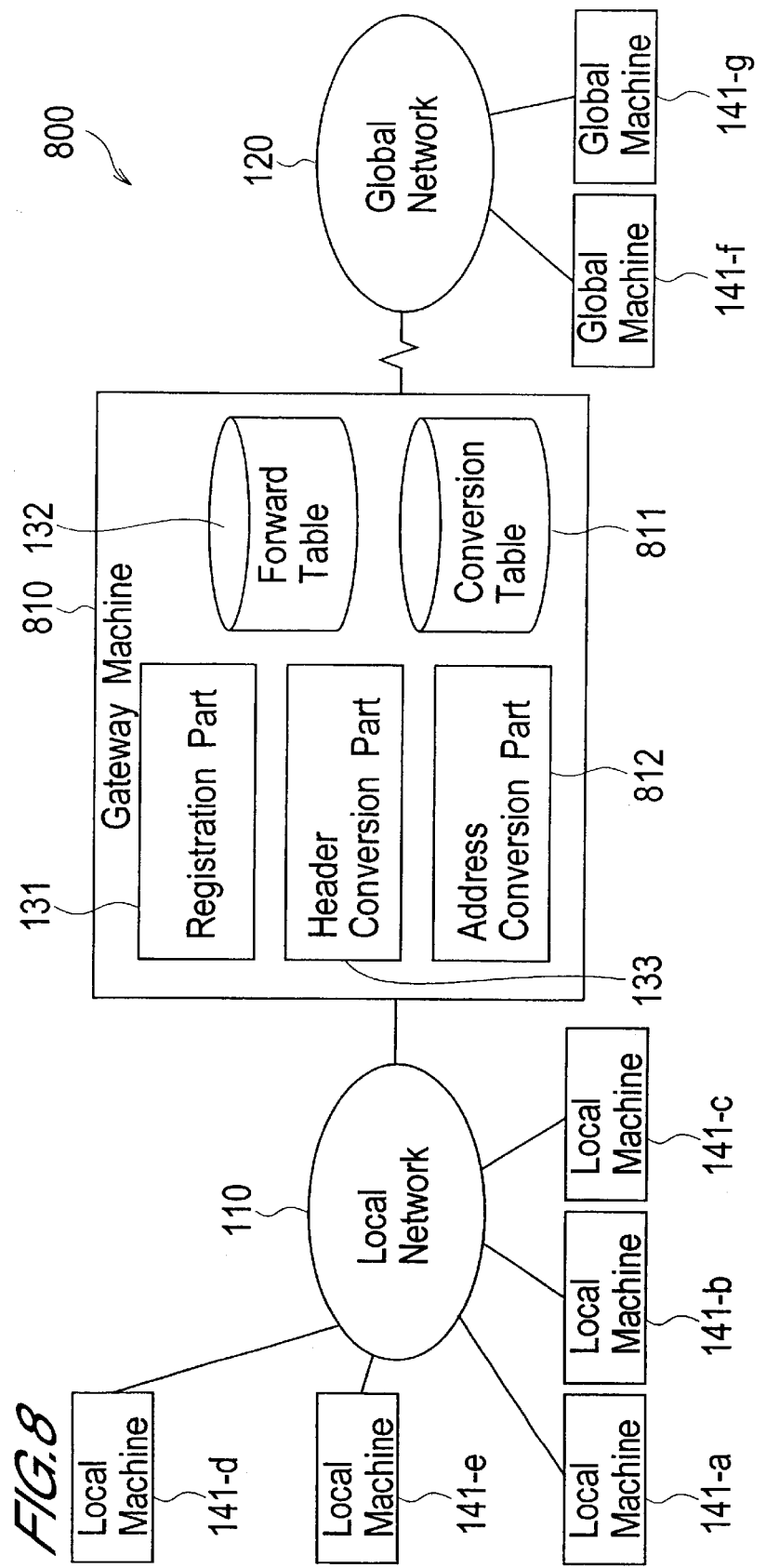
FIG. 8 is a conceptual diagram depicting a general structure of a communication network in accordance with the third embodiment.

FIG. 8 is a conceptual diagram depicting a general structure of a communication network 800 in accordance with the present invention.

In FIG. 8, composing elements are denoted with the same numerals as in FIG. 1.

In this embodiment, the same local machines as the first embodiment can be used for the local machines 141-a–141-e. This embodiment differs from the first embodiment in that the local machines 141-a–141-e of this embodiment have global addresses in addition to the local addresses L(a)–L(e). In the following description, it is assumed that the global address of the local machine 141-a is G(a), the global address of the local machine 141-b is G(b), the global address of the local machine 141-c is G(c), the global address of the local machine 141-d is G(d), and the global address of the local machine 141-e is G(e). The local network 110 may be connected to a local machine which does not communicate with the global machine. A local machine which does not communicate with a global machine need not have a global address, only a local address.

The gateway machine 810 has a conversion table 811 and an address conversion part 812, which is different from the gateway machine 130 in accordance with the first embodiment. The configuration of the registration part 131, the table 132 and the conversion part 133 is the same as the first embodiment.

The conversion table 811 is a memory for storing the correspondence relationship between the local addresses L(a)–L(e) and global addresses G(a)–G(e) of the local machines 141-a–141-e. A configuration example of the table 811 is conceptually shown in FIG. 9. The table 811 may be configured such that rewriting is possible when necessary, or may be configured such that rewriting is impossible. In this embodiment, the table 811 is configured such that rewriting is impossible.

The address conversion part 812 converts the destination address stored in the header area of a data packet, sent from the global network to the local network 110, from the global address to the local address using the table 811. In addition, the conversion part 812 reverse-converts the transmission origination address stored in the header area of a data packet, sent from the local network 110 to the global network 120, from the local address to the global address using the table 811.

Now the operation of the gateway machine 810 in accordance with this embodiment will be described in detail.

At first, the processing of a data packet to be sent to a local machine will be described.

Figures 9, 10:
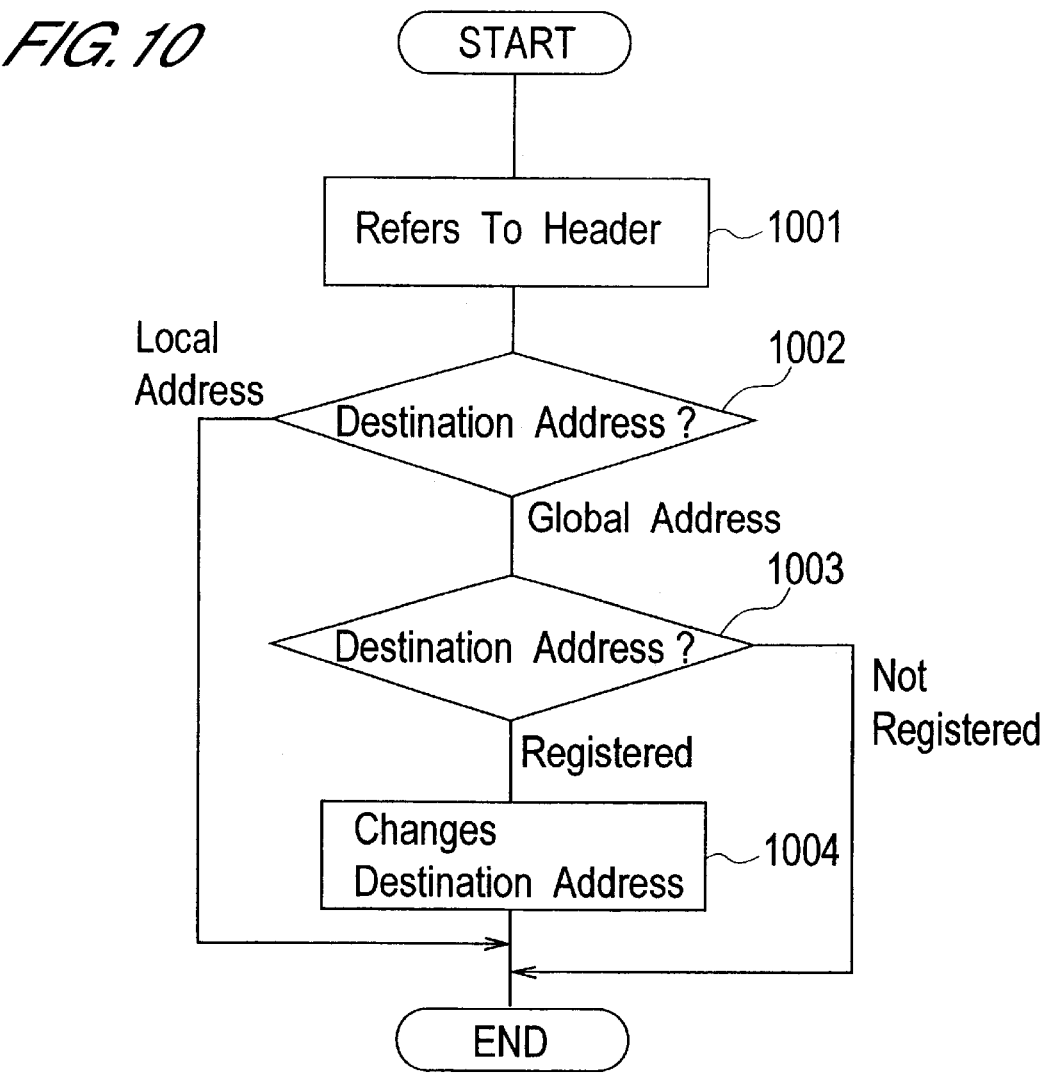
FIG. 9 is a conceptual diagram depicting a structure of a conversion table in accordance with the third embodiment.
FIG. 10 is a general flow chart depicting address conversion processing in accordance with the third embodiment.

When the gateway machine 810 receives a data packet via the local network 110 or the global network 120, the address conversion part 812 executes the following address conversion processing first. FIG. 10 is a general flow chart depicting the address conversion processing.

The address conversion part 812 reads the destination address from the header area of this data packet in the Step 1001.

Then the address conversion part.812 checks whether the read destination address is the global address of the local machine in Step 1002. If the read destination address is not the global address of the local machine, then the address conversion part 812 ends the address conversion processing.

If the read destination address is the global address of the local machine in the Step 1002, the address conversion part 812 searches this destination address from the global address column of the conversion table 811 in the Step 1003. If the destination address has not been registered, the address conversion part 812 ends the address conversion processing.

If the destination address has been registered in the Step 1003, then the address conversion part 812 reads the local address corresponding to this destination address from the conversion table 811. Then the address conversion part 812 rewrites the header area of the data packet with the read local address as the destination address in the Step 1004, and ends the address conversion processing.

The address conversion processing by the address conversion part 812 ends, then the gateway machine 810 has the header conversion part 133 execute the header conversion processing. A description on this header conversion processing is omitted since it is the same as the header conversion executed in the first embodiment.

Now the processing of the data packet to be sent to the global machine will be described.

Figure 11:
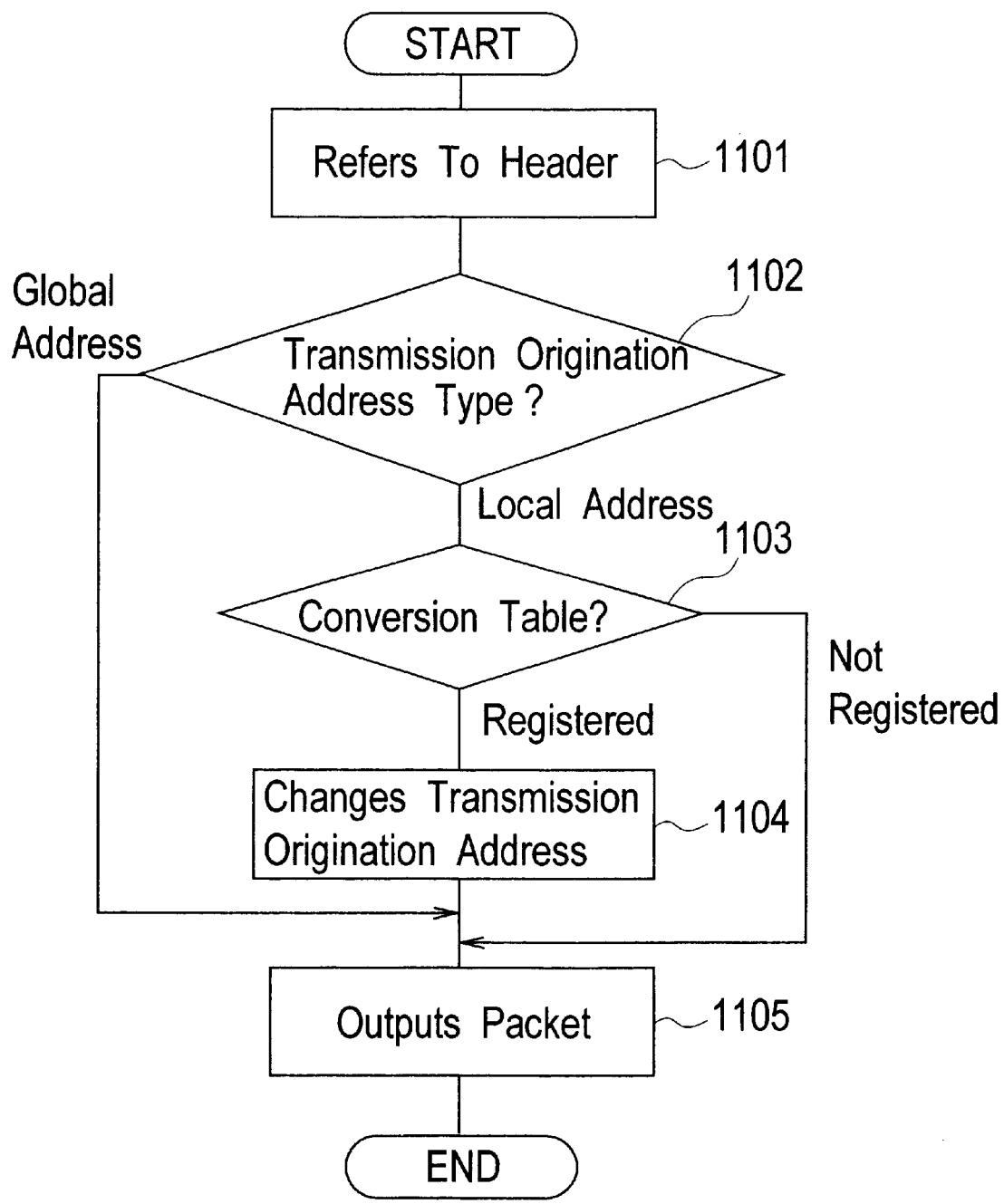
FIG. 11 is a general flow chart depicting reverse address conversion processing in accordance with the third embodiment.

When the gateway machine 810 receives a data packet via the local network 110 or the global network 120, the address conversion part 812 executes the following reverse address conversion processing. FIG. 11 shows a general flow chart depicting the reverse address conversion processing.

The address conversion part 812 reads the transmission origination address from the header area of this data packet in the Step 1101.

Then the address conversion part 812 checks whether the read transmission origination address is the local address of the local machine in the Step 1102. If the read destination address is not the local address of the local machine, then the address conversion part 812 outputs the data packet in the Step 1105, and ends the reverse address conversion processing.

If the read transmission origination address is the local address of the local machine in the Step 1102, the address conversion part 812 searches this transmission origination address from the local address column of the conversion table 811 in the Step 1103. If the transmission origination address has not been registered, then the address conversion part 812 outputs the data packet in the Step 1105, and ends the reverse address conversion processing.

If the destination address has been registered in the Step 1103, the address conversion part 812 reads the global address corresponding to this destination address from the conversion table 811. Then the address conversion part 812 rewrites the header area of the data packet with the read global address as the transmission origination address in the Step 1104, outputs the data packet in the Step 1105, and ends the address conversion processing.

The gateway machine in accordance with the present embodiment has the same advantages as the gateway machine in accordance with the first embodiment, and also has the advantage that the private address space can be accessed.

Fourth Embodiment

The general configuration of the gateway machine in accordance with the present embodiment is the same as that of the third embodiment (see FIG. 8). This embodiment differs from the gateway machine of the third embodiment in the function of the header conversion part 133.

The header conversion part 133 of this embodiment has the same header conversion function as that of the first embodiment. In addition, the conversion part 133 of this embodiment has the same reverse header conversion function as that of the second embodiment, that is, a function for converting the transmission origination address stored in the header of the data packet to be sent from the local machine to the global machine, using the table 132.

Now operation of the gateway machine in accordance with the present embodiment will be described in detail.

A description on the processing of the data packet to be sent to a local machine is omitted, since it is the same as that of the above mentioned third embodiment.

Processing of the data packet to be sent to the global machine will be described next.

When the gateway machine 810 receives a data packet via the local network 110 or the global network 120, the address conversion part 812 executes the following reverse header conversion processing first.

Figure 12:
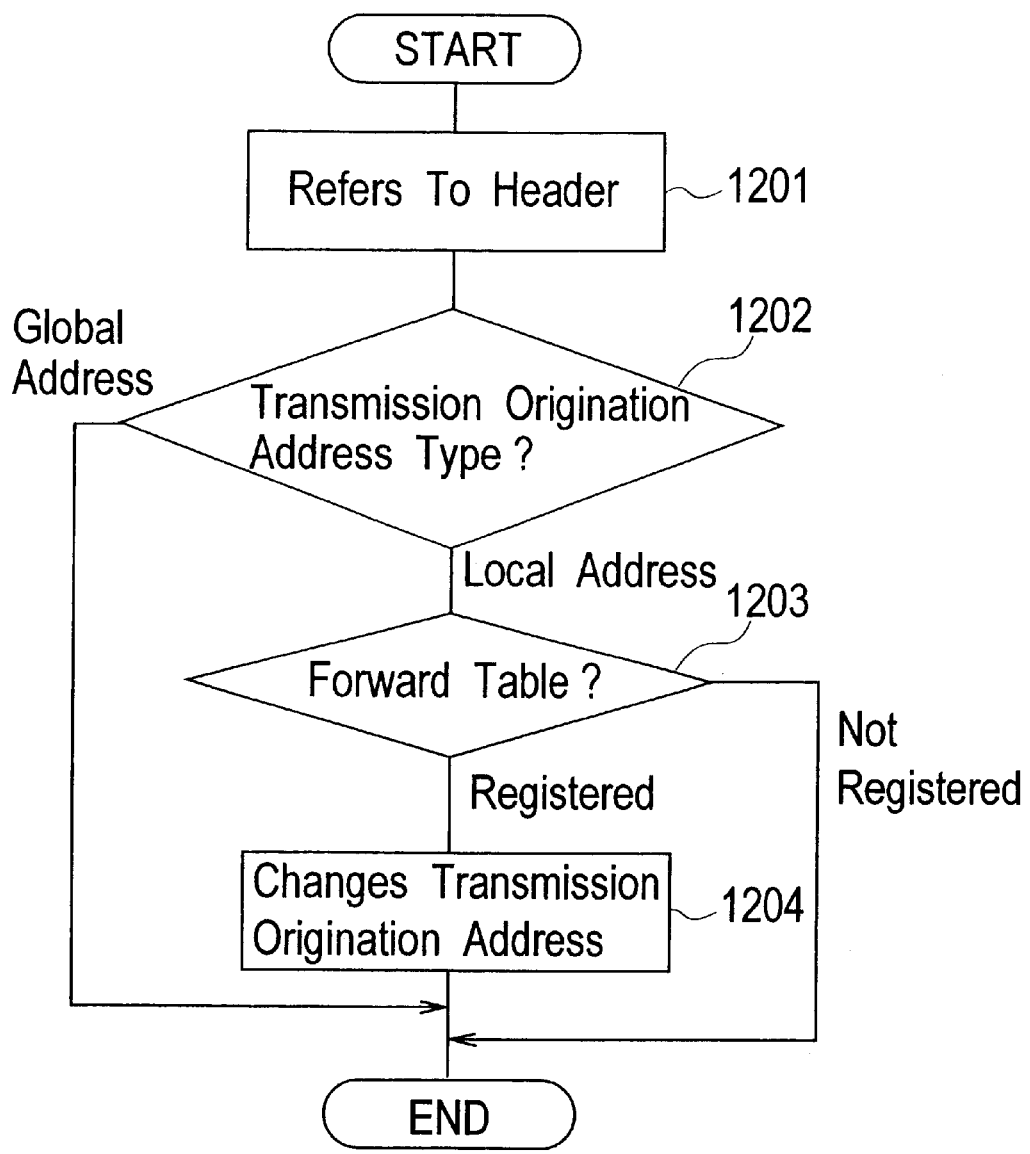
FIG. 12 is a general flow chart depicting reverse header conversion processing in accordance with the fourth embodiment.

FIG. 12 is a general flow chart depicting the reverse header conversion processing.

The header conversion part 133 reads the transmission origination address from the header area of the data packet in the Step 1201. Then the header conversion part 133 checks whether the read transmission origination address is the local address or the global address in the Step 1202. If the read transmission origination address is a global address, then the header conversion part 133 ends the reverse header conversion processing.

If the read transmission origination address is the local address in the Step 1202, the header conversion part 133 searches this transmission origination address from the forward destination address column of the table 132 in the Step 1203. If the transmission origination address has not been registered, then the header conversion part 133 ends the reverse header conversion processing.

If the transmission origination address has been registered in the Step 1203, the header conversion part 133 reads the forward origination address corresponding to this transmission origination address from the table 132. Then the header conversion part 133 rewrites the header area of the data packet with the read forward origination address as the transmission origination address in the Step 1204, and ends the reverse header conversion processing.

When the reverse header conversion processing ends, the gateway machine 810 has the address conversion part 812 execute the reverse address conversion processing. A description on this reverse address conversion processing is omitted since it is the same as the reverse address conversion processing described in the third embodiment (see FIG. 11).

Also descriptions on the packet forward destination registration processing, header conversion processing and address conversion processing are omitted since they are the same as those of the first embodiment.

The gateway machine in accordance with the present embodiment has the same advantages as the gateway machine in accordance with the third embodiment, and also has the advantage in that security can be improved by the reverse header conversion function.

Fifth Embodiment

The gateway machine in accordance with the fifth embodiment differs from the gateway machine in accordance with the fourth embodiment in that the address conversion and the header conversion can be executed by one processing, and the reverse address conversion and the reverse header conversion can also be executed by one processing. As described later, in the case of the gateway machine in accordance with the present invention, only processing which corresponds to the address conversion processing or only processing which corresponds to the reverse address conversion processing of the third and fourth embodiment is executed when communication is executed between a local machine and a global machine. When communication is executed between local machines, on the other hand, the header conversion processing or the reverse header conversion processing similar to the third and fourth embodiments is executed.

Figure 13:
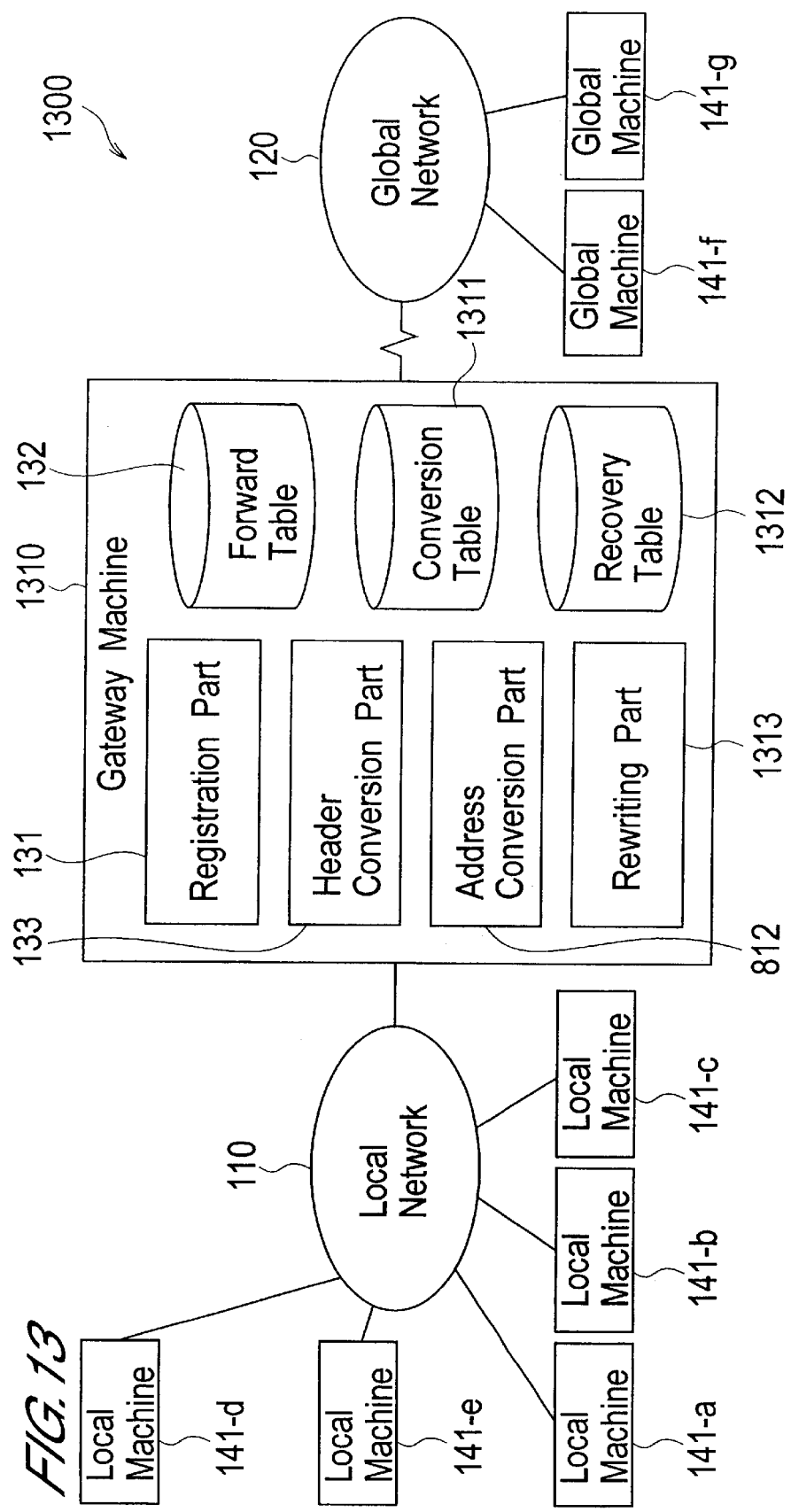
FIG. 13 is a conceptual diagram depicting a general structure of communication network in accordance with the fifth embodiment.

FIG. 13 is a conceptual diagram depicting a general structure of the communication network 1300 in accordance with the present embodiment.

In FIG. 13, composing elements which are the same as FIG. 8 are denoted with the same numerals as FIG. 8.

The gateway machine 1310 has a recovery table 1312 and the conversion table rewriting part 1313, which is different from the gateway machine 810 in accordance with the third and fourth embodiments (see FIG. 8). In addition, the conversion table 1311 in the gateway machine 1310 stores data which is different from the conversion table 811 in accordance with the third and fourth embodiments.

In the following description, the local address and the global address to be assigned to the local machines 141-a–141-e are the same as the case of the third embodiment. The local network 110 may be connected to a local machine which does not communicate with the global machine. The local machine which does not communicate with the global machine need not have a global address, only a local address.

The conversion table 1311 is the same as the conversion table 811 of the third and fourth embodiments (see FIG. 9) since the conversion table 1311 stores the correspondence relationship between the local addresses L(a)–L(e) and the global addresses G(a)–G(e). The difference of the conversion table 1311 in accordance with this embodiment from the conversion table 811 is that the conversion table 1311 stores the forward destination address as a local address, and stores the forward origination address as a global address. A rewritable memory is used for the conversion table 1311.

The recovery table 1312 is a memory for temporarily storing recovery data when the stored data of the conversion table 1311 is rewritten. The recovery data stored in the recovery table 1312 is used when the stored data of the conversion table 1311 is returned to the initial status. A configuration example of the recovery table 1312 is conceptually shown in FIG. 14. In the recovery table 1312, the correspondence relationship of the local address of the forward origination local machine, the global address of the forward origination local machine, and the local address of the forward destination local machine is stored. The number of entries of the recovery table 1312 matches with the number of entries of the forward table 132.

The rewriting part 1313 rewrites the conversion table 1311 with the recovery table 1312 inter-locking with the operation of the registration part 131. In other words, when the registration part 131 executes a new entry to the forward table 132, the rewriting part 1313 rewrites the entries related to the conversion table 1311, and executes new entries to the recovery table 1311. In addition, when the registration part 131 deletes an entry from the forward table 132, the rewriting part 1313 returns the entries related to the conversion table 1311 to the initial status, and deletes the related entries from the recovery table 1312.

Now the operation of the gateway machine 1310 in accordance with the present embodiment will be described in detail.

Figure 15:
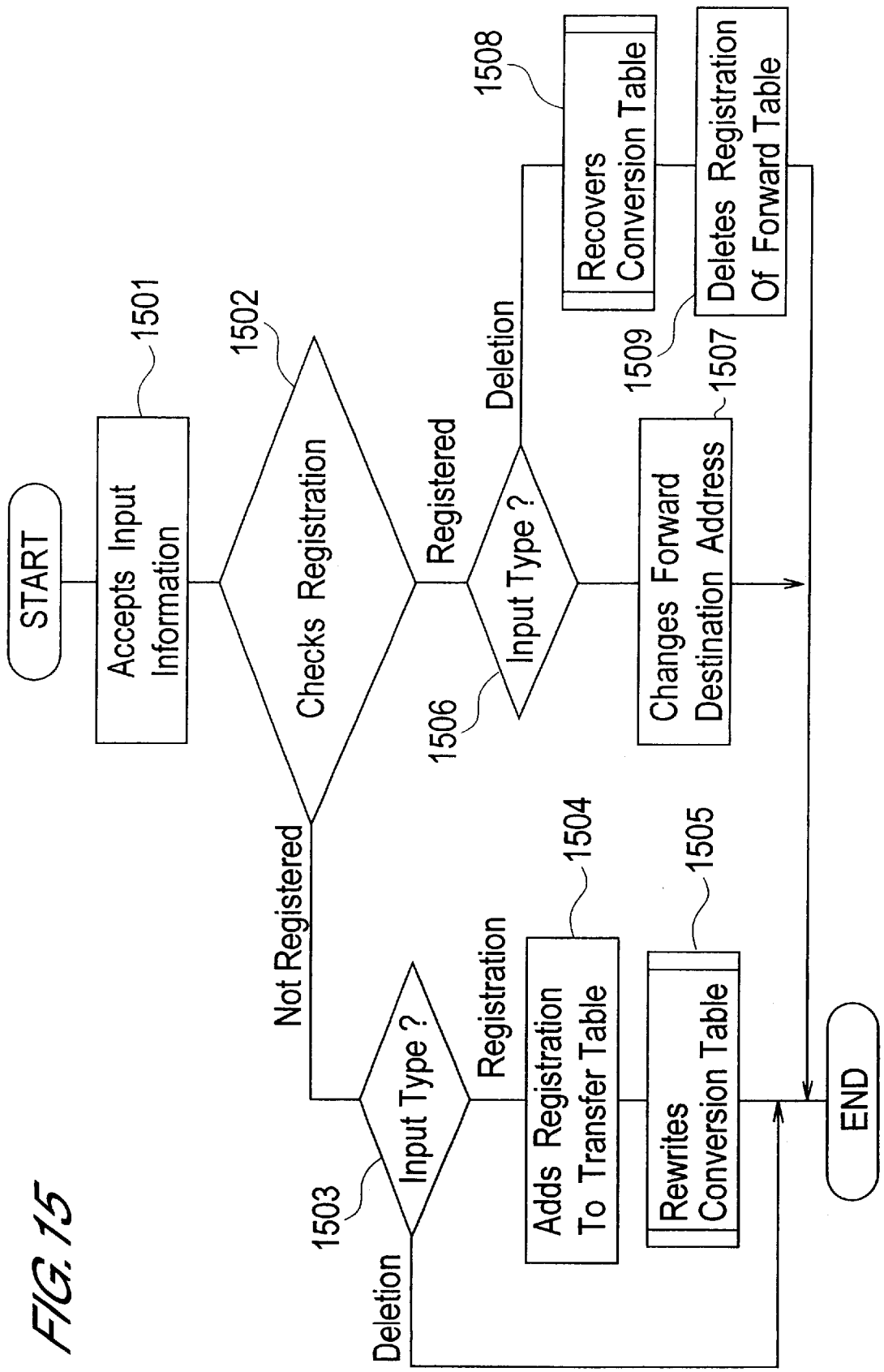
FIG. 15 is a general flow chart depicting forward destination registration processing in accordance with the fifth embodiment.

FIG. 15 is a general flow chart depicting the forward destination registration processing in accordance with this embodiment.

In the Step 1501, the registration part 131 accepts input information from outside the gateway machine 130. The input information is sent from one of the local machines or the global machine to the gateway machine 1310. The input information includes the local address of the forward origination, the local address of the forward destination, and the input type (see FIG. 5). The input type is a data to indicate the distinction between the forward registration and the deletion of registration.

In the Step 1502, the registration part 131 checks whether the forward origination local address stored in the input information has been registered as the forward origination local address of the forward table 132.

If it is judged that the forward origination local address stored in the input information has not been registered as the forward origination local address of the forward table 132, then the registration part 131 checks the input type stored in the input information in the Step 1503. If this input type is a deletion of registration, the registration part 131 ends the forward destination registration processing.

If the input type is a forward registration in the Step 1503, on the other hand, the registration part 131 adds a new entry to the forward table 132 in the Step 1504. As the forward origination local address and forward destination local address to be added, the forward origination local address and forward destination local address read from the input information are used. Then the registration part 131 has the rewriting part 1313 execute the conversion table rewriting sub-routine in the Step 1505.

Figure 16:
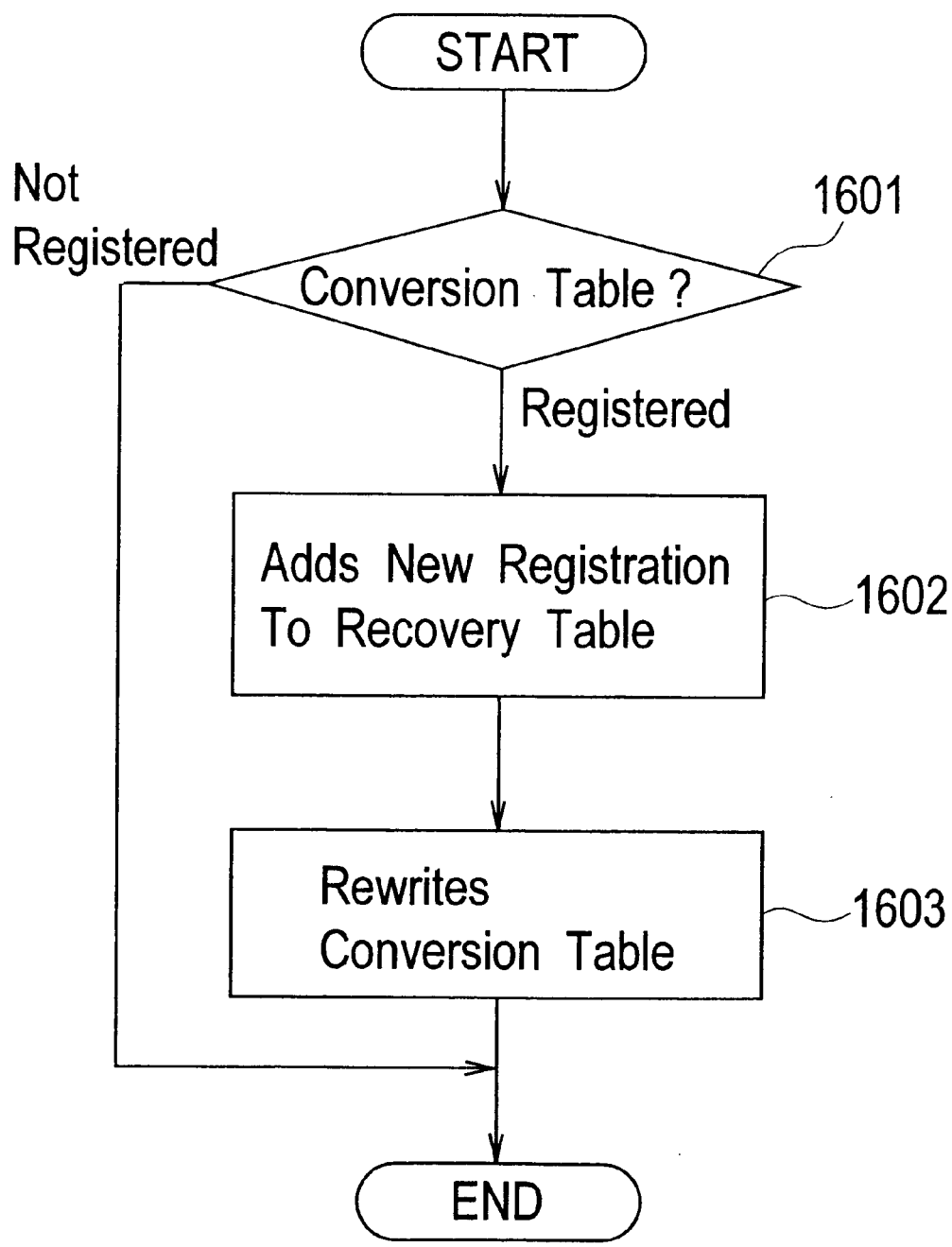
FIG. 16 is a flow chart depicting the conversion table rewrite sub-routine shown in FIG. 15.

FIG. 16 is a flow chart depicting the conversion table rewriting sub-routine.

At first, the rewriting part 1313 checks whether the forward origination local address of the input information has been registered in the conversion table 1311 in the Step 1601 of this sub-routine. If the forward origination local address has not been registered, the rewriting part 1313 ends the sub-routine.

If it is judged that the forward origination local address has been registered in the Step 1601, then the rewriting part 1313 saves the data for recovery shown in FIG. 14 in the recovery table 1312 in the Step 1602. In this save processing, the rewriting part 1313 writes the forward origination local address of the input information to the forward origination local address column of the recovery table 1312. Then the rewriting part 1313 reads the forward origination global address corresponding to this forward origination local address from the conversion table 1311, and writes it in the forward origination global address column of the recovery table 1312. In addition, the rewriting part 1313 writes the forward destination local address of the input information to the forward destination local address column of the recovery table 1312.

In the Step 1603, the rewriting part 1313 overwrites the column of the local address of the conversion table 1311 with the local address of the forward destination. By this, the local address of the conversion table 1311 is changed from the forward origination local address to the forward destination local address.

When execution of the sub-routine in FIG. 16 ends, the registration part 131 ends the forward destination registration processing.

If it is judged that the forward origination address of the input information has been registered in the Step 1502, then the registration part 131 checks the input type stored in the input information in the Step 1506. If this input type is a forward registration, the registration part 131 rewrites the forward table 132 in the Step 1507. In the rewriting in Step 1507, the forward destination address corresponding to this forward origination address is rewritten with the forward destination address stored in the input information. In the case when the forward origination address has been registered, the conversion table rewriting sub-routine is not executed, since the entry of the conversion table 1311 corresponding to the entry of the forward table 132 is not in initial status. After rewriting in the Step 1504, the registration part 131 ends the forward destination registration processing.

If it is judged that the input type is a registration delete in the Step 1506, then the registration part 131 has the rewriting part 1311 execute the conversion table recovery sub-routine in the Step 1508.

Figure 17:
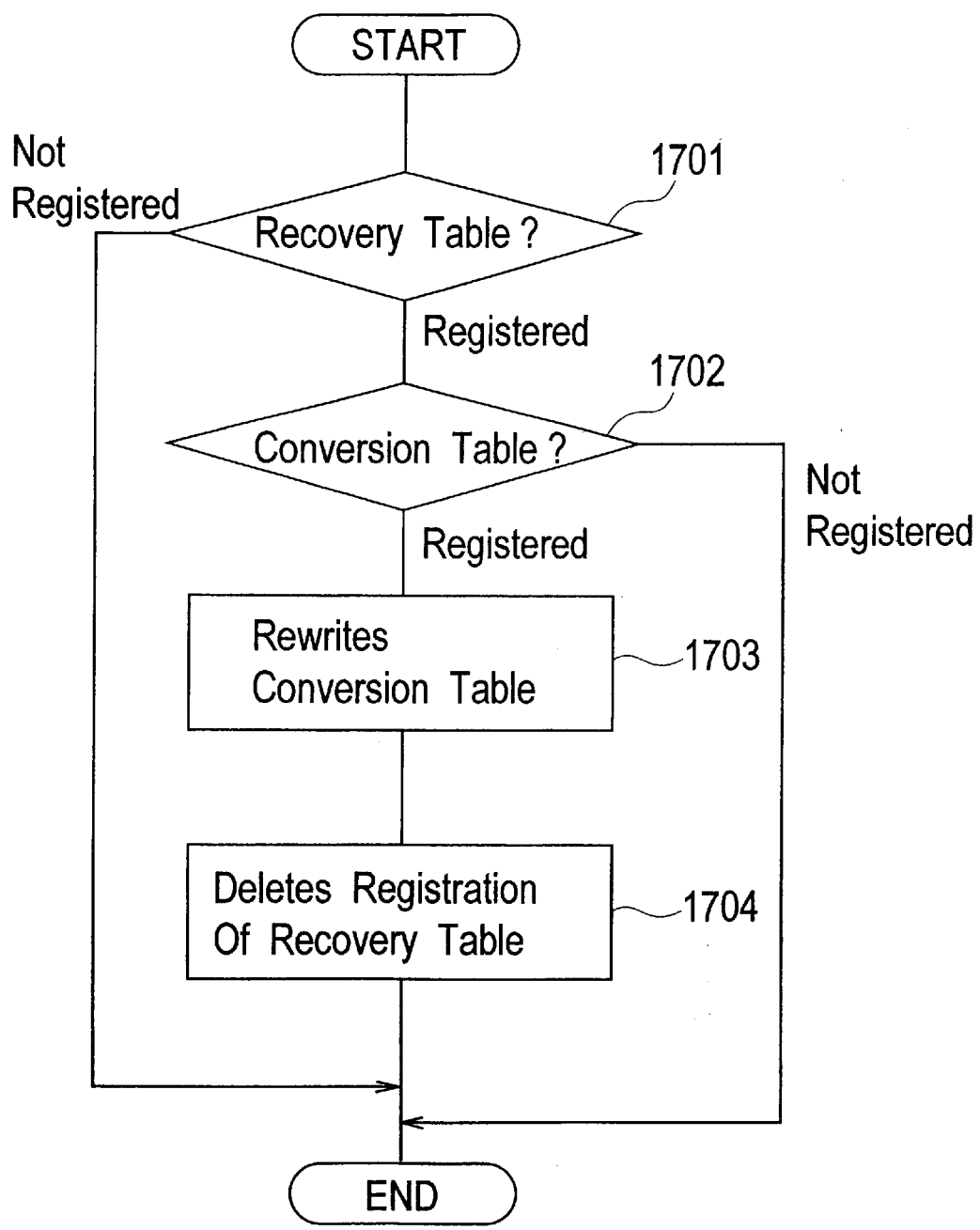
FIG. 17 is a flow chart depicting the conversion table recovery sub-routine shown in FIG. 15.

FIG. 17 is a flow chart depicting the conversion table recovery sub-routine.

At first, the rewriting part 1313 checks whether the entry corresponding to the pair of the forward origination local address and the forward destination local address in the input information exists in the recovery table 1311 in the Step 1701 of this sub-routine. If this entry does not exist, the rewriting part 1313 ends the sub-routine.

If it is judged that the entry of the recovery table 1311 exists in the Step 1701, the rewriting part 1313 searches the entry of the conversion table 1311 corresponding to the entry of the recovery table 1311 in the Step 1702. In this search processing, the forward origination global address and the forward destination local address are read from the entry of the recovery table 1312, then an entry matching this address pair is searched from the conversion table 1311. If a matching entry does not exist, the rewriting part 1313 ends the sub-routine.

If it is judged that a matching entry exists in the Step 1702, then the rewriting part 1313 recovers the conversion table 1311 in the Step 1703. In this recovery processing, the rewriting part 1313 reads the forward origination local address from the recovery table 1312, and rewrites the local address column of the conversion table 1311. By this, the local address of the conversion table 1311 is changed from the forward destination local address to the forward origination local address.

Then the rewriting part 1313 deletes the related entries of the recovery table 1312, and ends the sub-routine.

When the execution of the sub-routine in FIG. 17 ends, the registration part 131 deletes the related entries of the forward table 132 in the Step 1509, and ends the forward destination registration processing.

Now processing of a data packet in the gateway machine 1310 in accordance with the present embodiment will be described.

At first, the processing of a data packet to be transmitted to the local machine will be described.

When the destination address stored in the header area of the data packet is a global address, the address conversion part 812 executes the address conversion processing of this data packet. The content of the address conversion processing is the same as the case of the third embodiment (see FIG. 10). As mentioned above, in the case of the gateway machine 1310 of this embodiment, a pair of the forward origination global address and the forward destination local address is entered in the conversion table 1311. That is, in the address conversion processing of this embodiment, it is not necessary to execute the header conversion processing after the address conversion processing, since the forward origination global address is directly converted to the forward destination local address. Therefore the data packet after the address conversion processing is output to the local network 110 as is.

If the destination address stored in the header area of the data packet is a local address, the header conversion part 133 executes the header conversion processing for this data packet, just like the third and fourth embodiments, then the data packet is output to the local network 110.

Now the processing of the data packet to be transmitted to the global machine will be described.

The address conversion part 812 of the gateway machine 1310 executes the reverse address conversion processing for the transmission origination address stored in the header area of the data packet. The content of the reverse address conversion processing is the same as the case of the third embodiment (see FIG. 11). Unlike the case of the fourth embodiment, in the reverse address conversion processing of this embodiment, the transmission origination address stored in the header area of the data packet is converted directly from the forward destination local address to the forward origination global address. Therefore it is not necessary to execute the reverse header conversion processing before the reverse address conversion processing.

The gateway machine in accordance with this embodiment has the same advantages as the gateway machine in accordance to the third and fourth embodiments, and in addition, has an advantage in that the data packet processing speed can be increased.

Sixth Embodiment

The general configuration of the gateway machine in accordance with the present embodiment is the same as the case of the first embodiment (see FIG. 1). This embodiment differs from the gateway machine in the first embodiment in the content of the header conversion processing to be executed by the header conversion part 133.

The gateway machine in accordance with this embodiment is used for a local network where the "switching of systems" is cyclically executed for three or more server machines.

The present embodiment will now be described using the case of executing a "switching of systems" of the FTP server machines 141-a, 141-b and 141-c cyclically as an example.

In the initial status, only the server machine 141-a is the active system machine, and the other server machines 141-b and 141-c are standby system machines. When the first "switching of systems" is executed, the server machine 141-b becomes the active system machine, and the other server machines 141-c and 141-a become the standby system machines. And when the second "switching of systems" is executed, the server machine 141-c becomes the active system machine, and the other server machines 141-a and 141-b become the standby system machines.

In this embodiment, this kind of method of switching systems is referred to as "cyclical".

For the header conversion part 133 of the gateway machine in accordance with this embodiment, a chained forward function is used to execute header conversion processing, which is involved when the cyclical switching of systems is executed efficiently.

The gateway machine 130 of this embodiment executes processing for registering the forward destination of a packet and processing for converting the header information of the packet, just like the first embodiment.

Now the forward destination registration processing of this embodiment will be described comparing with the case of the first embodiment.

As mentioned above, only the server machine 141-*a* is the active system machine, and the other server machines 141-*b* and 141-*c* are the standby system machines in the initial status. Therefore, as shown in FIG. 18A, the registration part 131 executes the registration E1 for forwarding the data packet addressed to the machine 141-*b* to the machine 141-*a*, and the registration E2 for forwarding the data packet addressed to the machine 141-*c* to the machine 141-*a* for the forward table 132, in the initial status. This processing in the initial status of the present embodiment is the same as the case of the first embodiment.

Processing in this embodiment when the first switching of systems is executed is different from the case of the first embodiment. In the case of the first embodiment, the registration part 131 deletes the entry E1 (see Step 407 in FIG. 4), rewrites the forward destination address of the entry E2 to L(b) (see Step 406 in FIG. 4), and executes a new entry E3 to forward the data packet addressed to the machine 141-*a* to the machine 141-*b* (see Step 404 in FIG. 4), as shown in FIG. 18B. In the case of the present embodiment, on the other hand, only a delete of the entry E1 and a registration of the entry E3 are executed, as shown in FIG. 18C. In other words, the forward destination registration, which is involved when the first switching of systems is executed, includes three processes in the case of the first embodiment, but includes two processes in the case of this embodiment.

Processing for the second switching of systems is executed in the same sequence as the processing for the first switching of systems. That is, in the case of the first embodiment, the registration part 131 deletes the entry E2, rewrites the forward destination address of the entry E3 to L(c), and a new entry to forward the data packet addressed to the machine 141-*b* to the machine 141-*c* is executed. In the case of this embodiment, on the other hand, a delete of the entry E2 and a new entry to forward the data packet addressed to the machine 141-*b* to the machine 1410*c* is executed. In other words, the forward destination registration, which is involved when the second switching of systems is executed, includes three processes in the case of the first embodiment, but includes two processes in the case of this embodiment.

Now the header conversion processing of this embodiment will be described.

Figure 19:
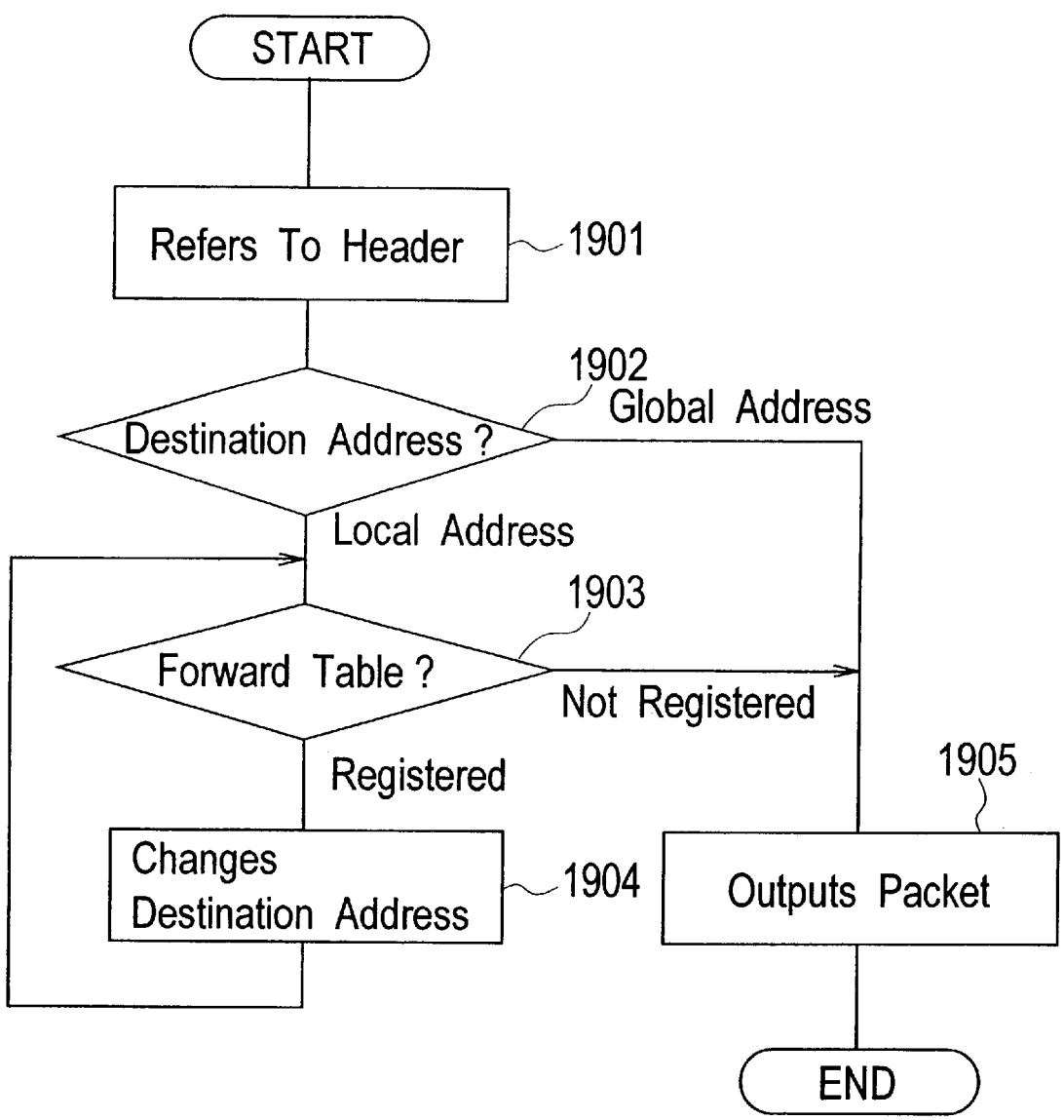
FIG. 19 is a general flow chart depicting header conversion processing in accordance with the sixth embodiment.

FIG. 19 is a general flow chart depicting the header conversion processing in accordance with the present embodiment.

The conversion part 133 receives a data packet from outside the gateway machine 130. When the data packet is received, the conversion part 133 reads the destination address from the header area of the data packet in the Step 1901. Then the conversion part 133 checks whether the read destination address is a local address or a global address in the Step 1902. If the read destination address is a global address, the conversion part 133 outputs this data packet to the global network 120 in the Step 1905, and ends the header information conversion processing.

If the read destination address is a local address in the Step 1902, then the conversion part 133 searches this destination address from the forward origination addresses in the table 132 in the Step 1903. If the destination address has been registered, then the conversion part 133 reads the forward destination address corresponding to this destination address from the table 132. Then the conversion part 133 overwrites the header area of the data packet with the read forward destination address as the destination address in the Step 1904.

Next, the conversion part 133 returns to the Step 1903, and searches this destination address from the forward origination addresses in the table 132. The destination address at this time is the destination address where the header area of the data packet was overwritten in the Step 1904. If the destination address has been registered, then the conversion part 812 executes the Step 1904. From here on, the same processing is repeated until it is judged that the destination address has not been registered in the Step 1903.

If the destination address has not been registered in step 1903, the conversion part 133 outputs this data packet to the local network 110 in the Step 1905, and ends the header information conversion processing.

As a concrete example of the header conversion processing, the case when the first switching of systems is executed, that is, the case when the stored data of the forward table 132 is as in FIG. 18C, will be described.

When the gateway machine 130 receives the data packet which destination address is L(a), the conversion part 133 first rewrites the destination address from L(a) to L(b) in the Step 1904, and judges that there is no entry in the nest Step 1903, and outputs the data packet in the Step 1905.

When the gateway machine 130 receives the data packet which destination address is L(b), the conversion part 133 executes output processing in the Step 1905 after executing the Step 1903 first, since there is no entry.

When the gateway machine 130 receives the data packet which destination address is L(c), the conversion part 133 rewrites the destination address L(c) to L(a) in the Step 1904 first, judges that there is an entry in the Step 1903, and rewrites the destination address L(a) to L(b) in the Step 1904. Then the conversion part 133 judges that there is no entry in the Step 1903, and outputs the data packet in the Step 1905. In other words, the conversion part 132 executes the chained header conversion processing for the data packet which destination address is L(c).

The gateway machine in accordance with the present invention has the same advantage as the gateway machine in accordance with the first embodiment, and in addition, has the advantages that the number of processes of the forward destination registration processing can be decreased, that is, that processing efficiency can be improved.

Additionally, by combining this embodiment with the first embodiment, more variations can be assigned to the forward destination registration processing.

In the above mentioned embodiments, the case when the packet repeater machine of the present invention is used for a peer-to-peer type local network was described. However, the packet repeater machine of the present invention can be used for a server-client type or other types of local networks as well. In the case of a peer-to-peer type network, the local machine is set to server mode or client mode, while in the case of the server-client type local network, dedicated server machines and dedicated client machines are used. Such differences between the peer-to-peer type and server-client type do not influence the advantages of the present invention.

The local machine to be used for the packet forward is not limited to FTP servers. For the local machine to be used for the packet forward, another type of server, a WWW server for example, can be used. In addition, for the local machine to be used for the packet forward, a machine other than a server machine, for example, a machine mounting real-time applications, which are used as an http (Web), Internet telephone and CHAT, can be used. Also for the local machine to be used for the packet forward, a machine mounting batch type applications, which are used for backup and the registration of virus patterns, can be used.

As mentioned above, the switching of systems is generally executed, for example, at maintenance and inspection, to update or change service content, and to shift to a high function machine, but the present invention can be applied to the switching of systems for other purposes.

The present invention can be applied not only to a machine where address mutual conversion between the local address and the global address are executed, but also for a machine where other types of address conversion is executed.

The present invention can be applied not only to a machine which conforms to TCP/IP but also to a machine which conforms to another communication protocol, such as IPX.

The present invention can be applied to a machine other than the gateway machine, only if the machine is disposed between segments of a local network. For example, the present invention can be applied to a router machine.

What is claimed is:

1. A packet repeater machine comprising:
   forward information storage for storing a relationship between a forward origination address and a forward destination address;
   a forward register for registering said forward origination address and said forward destination address to said forward information storage based on input information from outside, wherein said input information includes forward origination address information, forward destination address information, and input type information indicating the distinction between a forward registration and deletion of registration; and
   a header converter for converting a destination address to said forward destination address when said destination address which is stored in a packet to be transmitted from a first network to a second network, matches said forward origination address registered in said forward information storage,
   wherein said forward register further comprises an eraser for deleting registration corresponding to said forward origination address information from said forward information storage when said input type information indicates said deletion of registration; and a rewriter for rewriting said forward information storage so that said forward destination address of the registration corresponding to said forward origination address information becomes an address indicating said forward destination address information when said input type information indicates said forward registration and registration has already been executed.

2. A packet repeater machine comprising:
   forward information storage for storing a relationship between a forward origination address and a forward destination address;
   a forward register for registering said forward origination address and said forward destination address to said forward information storage based on input information from outside;
   a header converter for converting a destination address to said forward destination address when said destination address which is stored in a packet to be transmitted from a first network to a second network, matches said forward origination address registered in said forward information storage;
   conversion information storage for storing conversion information indicating the relationship between the address for said first network and the address for said second network in each terminal machine connected to said second network, wherein said conversion information storage stores said forward origination address as an address for said first network and stores said forward destination address as an address for said second network;
   an address converter for converting a destination address to an address for said second network when said destination address, which is stored in a packet transmitted from said first network to said second network, is an address for said first network;
   a rewriter for rewriting an address for said second network stored in said conversion information storage to an address for said second network indicating said forward destination address based on input information from outside; and
   recovery information storage for storing stored information in said conversion information storage before being rewritten by said rewriter as recovery information.

3. The packet repeater machine according to claim 2, wherein said recovery information includes an address for said second network as said forward origination address, an address for said first network as said forward origination address, and an address for said second network as said forward destination address.

4. The packet repeater machine according to claim 3, wherein said rewriter further comprises a return converter for returning the address for said second network stored in said conversion information storage to the address before registration using said recovery information when said input information includes input type information to indicate a deletion of registration.

5. The packet repeater machine according to claim 2, wherein the forward register comprises an address register for registering said forward origination address and said forward destination address in said forward information storage for each step of packet forward when the packet forward is cyclical.

6. The packet repeater machine according to claim 5, wherein said header converter executes a chain of operations to convert a destination address stored in a packet to said forward destination address.

7. A packet relay method comprising the steps of:
   registering said forward origination address and said forward destination address in the forward information storage based on input information from outside, wherein said input information includes forward origination address information, forward destination address information, and input type information to indicate a distinction between a forward registration and deletion of registration; and executing header conversion processing for converting a destination address to said forward destination address when said destination address, which is stored in a packet to be transmitted from the first network to the second network, matches with said forward origination address registered in said forward information storage, wherein said registration step includes a step of deleting registration corresponding to said forward origination address from said forward information storage when said input type information indicates said deletion of registration, and a step of rewriting said forward information storage when said input type information indicates said forward registration and registration has already been executed, so that said forward destination address of the registration corresponding to said forward origination address information becomes the address indicated by said forward destination address information.

8. The packet relay method according to claim 7, wherein said header conversion processing includes a step of reverse-converting a transmission origination address to said forward origination address when said transmission origination address, which is stored in a packet to be transmitted from said second network to said first network, matches said forward destination address registered in said forward information storage.

9. A packet relay method comprising the steps of:

registering said forward origination address and said forward destination address in the forward information storage based on first input information from outside;

executing header conversion processing for converting a destination address to said forward destination address when said destination address, which is stored in a packet to be transmitted from the first network to the second network, matches with said forward origination address registered in said forward information storage;

executing address conversion processing to convert a destination address to an address for said second network using conversion information storage when said destination address, which is stored in the packet to be transmitted from said first network to said second network, is an address for said first network, wherein said conversion information storage stores said forward origination address as an address for said first network, and stores said forward destination address as an address for said second network;

rewriting an address for said second network stored in said conversion information storage to the address for said second network indicating said forward destination address, based on second input information from outside; and storing the information stored in said conversion information storage, before being rewritten by said rewriting step, in the recovery information storage as recovery information.

10. The packet relay method according to claim 9, wherein said recovery information includes an address for said second network as said forward origination address, an address for said first network as said forward origination address and an address for said second network as said forward destination address.

11. The packet relay method according to claim 10, wherein said rewriting step includes a step of returning an address for said second network stored in said conversion information storage back to the address before registration using said memory recovery information when input type information to indicate a deletion of registration is included in said input information.

12. The packet relay method according to claim 9, wherein said registration step includes a step of registering said forward origination address and said forward destination address to said forward information storage for each step of the packet forward when the forward is cyclic.

13. The packet relay method according to claim 12, wherein said header conversion processing executes a chain of operation to convert the destination address stored in the packet to said forward destination address.

14. The packet repeater machine according to claim 2, wherein said header converter further rewrites said destination address rewritten by said address converter.

15. The packet repeater machine according to claim 2, wherein said address converter comprises a reverse-converter for converting a transmission origination address to an address for said first network, when said transmission origination address, which is stored in a packet to be transmitted from said second network to said first network, is an address for said second network.

16. The packet repeater machine according to claim 2, wherein said header converter comprises a reverse converter for converting a transmission origination address to said forward origination address when said transmission origination address, which is stored in a packet to be transmitted from said second network to said first network, matches with said forward destination address registered in said forward information storage.

17. The packet relay method according to claim 9, wherein said header conversion processing includes a step of further rewriting said destination address rewritten by said address conversion processing.

18. The packet relay method according to claim 9, wherein said address conversion processing includes a step of reverse-converting a transmission origination address to an address for said first network when said transmission origination address, which is stored in a packet to be transmitted from said second network to said first network, is an address for said second network.

* * * * *

UNITED STATES PATENT AND TRADEMARK OFFICE
CERTIFICATE OF CORRECTION

PATENT NO. : 6,667,974 B1
DATED : December 23, 2003
INVENTOR(S) : Yoshiaki Shigeta It is certified that error appears in the above-identified patent and that said Letters Patent is hereby corrected as shown below:

<u>Title page,</u>
Item [73], Assignee, insert -- Tokyo -- after "Ltd.".

Signed and Sealed this

Eighteenth Day of May, 2004

JON W. DUDAS
*Acting Director of the United States Patent and Trademark Office*